United States Patent
Damnjanovic et al.

(10) Patent No.: US 9,019,902 B2
(45) Date of Patent: Apr. 28, 2015

(54) CHANNEL QUALITY FEEDBACK IN MULTICARRIER SYSTEMS

(75) Inventors: Jelena M. Damnjanovic, Del Mar, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 12/616,011

(22) Filed: Nov. 10, 2009

(65) Prior Publication Data

US 2010/0118817 A1 May 13, 2010

Related U.S. Application Data

(60) Provisional application No. 61/113,401, filed on Nov. 11, 2008.

(51) Int. Cl.
*H04L 5/00* (2006.01)
*H04L 1/00* (2006.01)
(Continued)

(52) U.S. Cl.
CPC .............. *H04L 5/0053* (2013.01); *H04B 7/063* (2013.01); *H04B 7/0634* (2013.01);
(Continued)

(58) Field of Classification Search
USPC ................. 370/334, 339, 345, 347, 350, 329, 370/395.42, 444; 455/70, 136, 269, 272, 455/273, 277, 279.1, 450–452.2, 502, 509, 455/552.1, 69, 522
See application file for complete search history.

(56) References Cited

U.S. PATENT DOCUMENTS 7,957,351 B2 * 6/2011 Casaccia et al. .............. 370/334
8,094,761 B2 * 1/2012 Zhang et al. ................... 375/346
(Continued)

FOREIGN PATENT DOCUMENTS

CN 101154987 A 4/2008
EP 2104370 A1 9/2009
(Continued)

OTHER PUBLICATIONS

3rd Generation Partnership Project: "3GPP TS 36.213 V8.4.0 Technical Specification Group Radio Access Network; Evolved Universal Terrestrial Radio Access (E-UTRA); Physical layer procedures (Release 8)" [Online] Sep. 1, 2008, pp. 1-60, XP002581188 Retrieved from the Internet: URL:http://www.3gpp.org/ftp/Specs/archive/36_series/36.213/36213-840.zip> [retrieved on May 6, 2010] p. 30-p. 32.

(Continued)

*Primary Examiner* — Habte Mered
(74) *Attorney, Agent, or Firm* — Paul Kuo

(57) ABSTRACT

A wireless communication system facilitates multichannel periodic and aperiodic feedback (e.g., Channel Quality Indicator (CQI), Rank indicator (RI), Precoding Matrix Indicator (PMI)) from a population of user equipment while facilitating legacy single carrier communication. Paired downlink (DL)/ uplink (UL) or many-to-one mapping communication can be established by common system information or dedicated signaling. In one aspect, a flag sent by system information or by dedicated signaling can indicate which means controls. Feedback can be configured for each carrier independently reported in a concatenated in frequency fashion, reported in a cycle in time fashion, or reported in a staggered in time and frequency fashion. Feedback can be reported jointly as one wide bandwidth. Feedback can be a single report perhaps reported on a data channel for more capacity or by cycled carrier/subband reporting.

36 Claims, 15 Drawing Sheets

(51) Int. Cl.
*H04L 25/03* (2006.01)
*H04B 7/06* (2006.01)
*H04L 1/16* (2006.01)

(52) U.S. Cl.
CPC ........... *H04B 7/0632* (2013.01); *H04L 1/0026* (2013.01); *H04L 1/0027* (2013.01); *H04L 1/0029* (2013.01); *H04L 1/1671* (2013.01); *H04L 5/0023* (2013.01); *H04L 5/0057* (2013.01); *H04L 25/03343* (2013.01); *H04L 2025/03802* (2013.01)

(56) References Cited

U.S. PATENT DOCUMENTS

| | | | |
|---|---|---|---|
| 2005/0129058 A1 | 6/2005 | Casaccia et al. | |
| 2006/0153061 A1 | 7/2006 | Nishio | |
| 2007/0191066 A1* | 8/2007 | Khojastepour et al. | 455/562.1 |
| 2007/0230397 A1* | 10/2007 | Sakata | 370/329 |
| 2008/0219370 A1* | 9/2008 | Onggosanusi et al. | 375/260 |
| 2010/0002664 A1* | 1/2010 | Pan et al. | 370/338 |
| 2010/0027447 A1* | 2/2010 | Choi et al. | 370/280 |
| 2010/0177713 A1 | 7/2010 | Yoshii et al. | |
| 2012/0051248 A1* | 3/2012 | Roh et al. | 370/252 |
| 2012/0213187 A1* | 8/2012 | Yang et al. | 370/329 |

FOREIGN PATENT DOCUMENTS

| | | |
|---|---|---|
| JP | 2005027107 A | 1/2005 |
| JP | 2007274094 A | 10/2007 |
| RU | 2006115594 A | 11/2007 |
| WO | WO2006116102 | 11/2006 |
| WO | 2007089797 A2 | 8/2007 |
| WO | 2008001727 A1 | 1/2008 |
| WO | 2008018462 A1 | 2/2008 |
| WO | WO2008084810 | 7/2008 |
| WO | WO2008127015 | 10/2008 |

OTHER PUBLICATIONS

International Search Report & Written Opinion—US2009/064056—International Search Authority—European Patent Office—Jun. 7, 2010.
008 Partial International Search Report—PCT/US09/064056, International Search Authority—European Patent Office—Mar. 16, 2010.
Taiwan Search Report—TW098138294—TIPO—Jan. 20, 2013.

* cited by examiner

| PUCCH Report Type | Reported | Mode State | PUCCH Reporting Modes | | | |
|---|---|---|---|---|---|---|
| | | | Mode 1-1 (Wideband, single PMI) | Mode 2-1 (Subband, single PMI) | Mode 1-0 (Wideband, no PMI) | Mode 2-0 (Subband, no PMI) |
| | | | (bits/BP) | (bits/BP) | (bits/BP) | (bits/BP) |
| 1 | Sub-band CQI | RI = 1 | NA | (4+L)*C | NA | (4+L)*C |
| | | RI > 1 | NA | (7+L)*C | NA | (4+L)*C |
| 2 | Wideband CQI/PMI | 2 TX Antennas RI = 1 | 8*C | | NA | NA |
| | | 4 TX Antennas RI = 1 | 8*C | 8*C | NA | NA |
| | | 2 TX Antennas RI > 1 | 11*C | 11*C | NA | NA |
| | | 4 TX Antennas RI > 1 | 11*C | 1*C | 1*C | 1*C |
| 3 | RI | 2-layer spatial multiplexing | 1*C | 1*C | 1*C | 1*C |
| | | 4-layer spatial multiplexing | 2*C | 2*C | 2*C | 2*C |
| 4 | Wideband CQI | RI = 1 | NA | NA | 4*C | 4*C |

*FIG. 7*

CHANNEL QUALITY FEEDBACK IN MULTICARRIER SYSTEMS

CLAIM OF PRIORITY UNDER 35 U.S.C. §119

The present Application for patent claims priority to Provisional Application No. 61/113,401 entitled "UE FEEDBACK IN MULTICARRIER SYSTEMS" filed Nov. 11, 2008, and assigned to the assignee hereof and hereby expressly incorporated by reference herein.

BACKGROUND

1. Field

The present disclosure relates generally to communication, and more specifically to techniques for channel quality feedback in multiple carrier wireless communication network.

2. Background

The 3rd Generation Partnership Project (3GPP) Long Term Evolution (LTE) represents a major advance in cellular technology and is the next step forward in cellular 3G services as a natural evolution of Global system for mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Recently, LTE Advanced is an evolving mobile communication standard for providing 4G services. Being defined as 3G technology, LTE does not meet the requirements for 4G also called IMT Advanced as defined by the International Telecommunication Union such as peak data rates up to 1 Gbit/s. Besides the peak data rate, LTE Advanced also targets faster switching between power states and improved performance at the cell edge.

Multiple carriers on downlink and uplink facilitate the expanded bandwidth. However, this introduces additional feedback reporting requirements for user equipment (UE) on the uplink. Various possible combinations of downlink carrier(s) and uplink carrier(s) can complicate such feedback since overhead can be increased to report on additional bandwidth. In addition, implicit pairing of a single downlink carrier to a single uplink carrier is complicated by various implicit or explicit possibilities of pairings or groupings of carriers that would require feedback for efficient network operation.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a wireless communication system that facilitates configuring multichannel feedback (e.g., Channel Quality Indicator (CQI), Rank indicator (RI), Precoding Matrix Indicator (PMI)) from a population of user equipment while advantageously also facilitating legacy single carrier communication by a single downlink (DL) carrier and a single uplink (UL) carrier.

In one aspect, a method is provided for transmitting uplink feedback for multiple downlink carriers by employing a processor executing computer executable instructions stored on a computer readable storage medium to implement following acts: A plurality of downlink carriers is received. An uplink carrier assigned for feedback for at least one of the plurality of downlink carriers is determined. Feedback on the uplink carrier is transmitted.

In another aspect, a computer program product is provided for transmitting uplink feedback for multiple downlink carriers. At least one computer readable storage medium stores computer executable instructions that, when executed by at least one processor, implement components: A first set of instructions causes a computer to receive a plurality of downlink carriers. A second set of instructions causes the computer to determine an uplink carrier assigned for feedback for at least one of the plurality of downlink carriers. A third set of instructions causes the computer to transmit feedback on the uplink carrier.

In an additional aspect, an apparatus is provided for transmitting uplink feedback for multiple downlink carriers. At least one computer readable storage medium stores computer executable instructions that, when executed by the at least one processor implement, components: Means are provided for receiving a plurality of downlink carriers. Means are provided for determining an uplink carrier assigned for feedback for at least one of the plurality of downlink carriers. Means for transmitting feedback on the uplink carrier.

In a further aspect, an apparatus is provided for transmitting uplink feedback for multiple downlink carriers. A receiver receives a plurality of downlink carriers. A computing platform determines an uplink carrier assigned for feedback for at least one of the plurality of downlink carriers. A transmitter transmits feedback on the uplink carrier.

In yet one aspect, a method is provided for receiving uplink feedback for multiple downlink carriers by employing a processor executing computer executable instructions stored on a computer readable storage medium to implement following acts: A plurality of downlink carriers are transmitted. An uplink carrier assigned for feedback for at least one of the plurality of downlink carriers is established. Feedback is received on the uplink carrier.

In yet another aspect, a computer program product is provided for receiving uplink feedback for multiple downlink carriers. At least one computer readable storage medium stores computer executable instructions that, when executed by at least one processor, implement components: A first set of instructions causes a computer to transmit a plurality of downlink carriers. A second set of instructions causes the computer to establish an uplink carrier assigned for feedback for at least one of the plurality of downlink carriers. A third set of instructions causes the computer to receive feedback on the uplink carrier.

In yet an additional aspect, an apparatus is provided for receiving uplink feedback for multiple downlink carriers. At least one computer readable storage medium stores computer executable instructions that, when executed by the at least one processor, implement components: Means are provided for transmitting a plurality of downlink carriers. Means are provided for establishing an uplink carrier assigned for feedback for at least one of the plurality of downlink carriers. Means are provided for receiving feedback on the uplink carrier.

In yet a further aspect, an apparatus is provided for receiving uplink feedback for multiple downlink carriers. A transmitter transmits a plurality of downlink carriers. A computing platform establishes an uplink carrier assigned for feedback for at least one of the plurality of downlink carriers. A receiver receives feedback on the uplink carrier.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 7 depicts a diagram of a first data structure for a single feedback report format.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
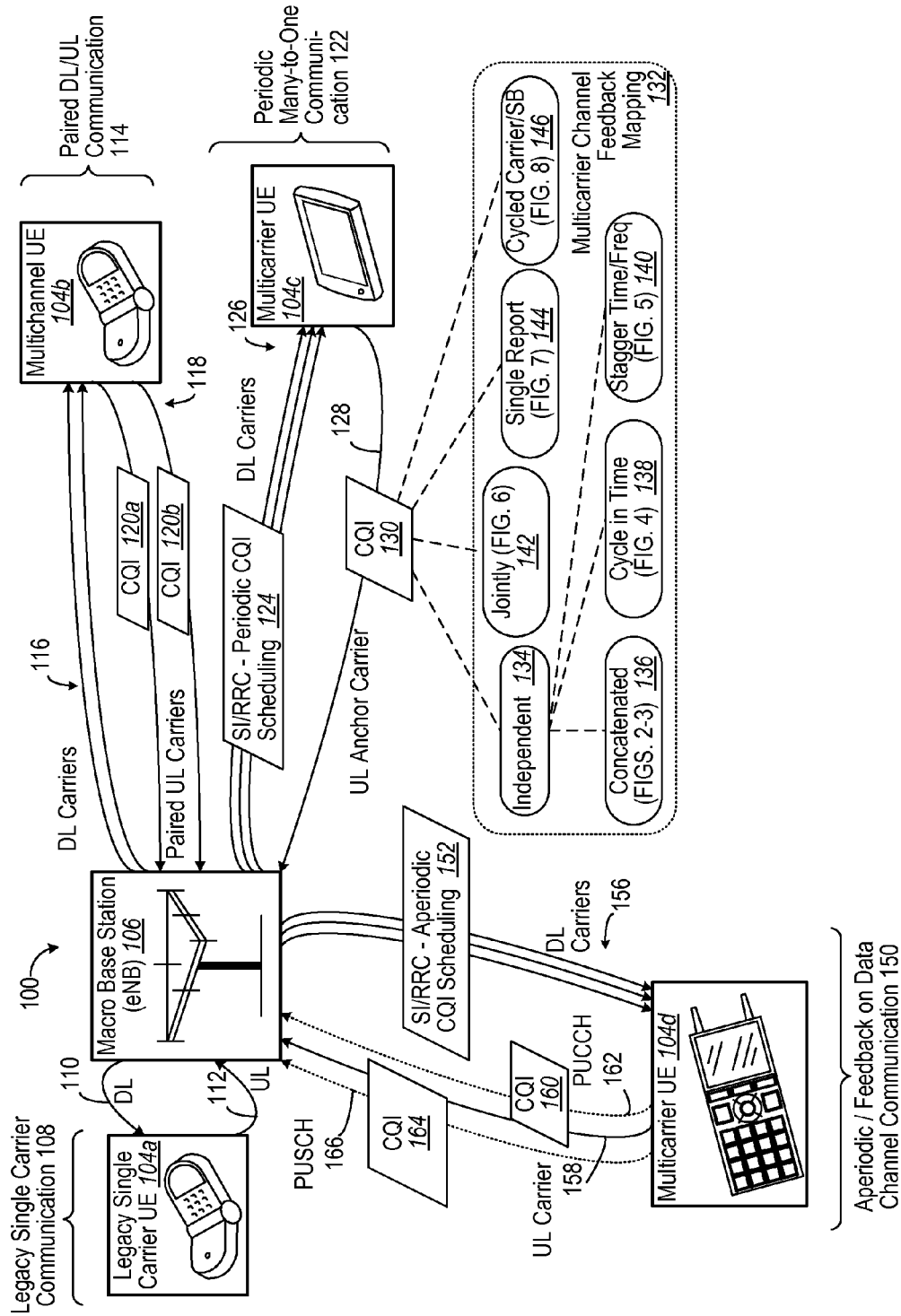
FIG. 1 depicts a block diagram of a wireless communication system that facilitates feedback as part of multiple carrier communication between a node and a population of user equipment (UE).

In FIG. 1, a wireless communication system 100 facilitates multichannel feedback (e.g., Channel Quality Indicator (CQI), Rank indicator (RI), Precoding Matrix Indicator (PMI)) from a population of user equipment (UE) 104a-104d to a serving node, depicted as a macro evolved base node (eNB) 106. In particular, the eNB 106 is facilitating legacy single carrier communication depicted at 108 with a legacy single carrier UE 104a that receives a single downlink (DL) carrier 110 and transmits a single uplink (UL) carrier 112.

Advantageously, the eNB 106 supports multicarrier UEs 104b-104d. For example, paired DL/UL communication is depicted at 114 with the multicarrier UE 104b wherein multiple DL carriers 116 are paired with multiple UL carriers ("paired UL carriers") 118. The multicarrier UE 104b can employ associations by transmitting channel feedback, depicted as CQIs 120a-120b on the corresponding paired UL carrier 118.

As another example, periodic many-to-one mapping communication is depicted at 122 with the multicarrier UE 104c wherein commonly broadcast System Information (SI) or UE-specific (dedicated signaling) Radio Resource Control (RRC) signaling 124 on multiple DL carriers 126 designate an UL anchor carrier 128 for channel feedback, depicted as CQI feedback 130. Thus, the one UL anchor carrier 128, which can be one of many UL anchor carriers 128 received by the eNB 106, can be designated rather than being necessarily paired with one of the DL carriers 126. It should be appreciated that many-to-one DL/UL is depicted for clarity; however, implementations can entail various combinations of DL to UL mapping of carriers (e.g., five to two).

Thus, the designation/mapping for CQI feedback for multiple DL carriers 126 can be conveyed on a flag indicating if the CQI feedback is sent on the UL carrier paired with the DL carrier for which the CQI feedback is sent, or on the anchor UL carrier, regardless of pairing. Alternatively or in addition, the designation/mapping can be conveyed on the system information (common) or by RRC signaling (per UE) as previously mentioned. The designation/mapping can be transparent to the legacy UE 104*a* whereas multicarrier UE 104*b*-104*d* can use this indicator flag for detecting appropriate assignment. In a more general case CQI feedback can be sent on any designated UL carrier in accordance with scheduling conveyed to UE by RRC signaling. Different UEs could have different designated UL anchor carriers 128 for CQI feedback. If the multiple DL carrier CQI feedbacks 130 are sent on one designated UL anchor carrier 128, that UL anchor carrier 128 carries the CQI feedback 130 for the DL carriers 126 it is paired with as well as the CQI feedback 130 for the other DL carriers 126. There can be some UL anchor carriers 128 that do not carry any CQI feedback 130; those UL anchor carriers 128 can still carry legacy UEs CQI feedback, if there are any legacy UEs 104*a* on those UL anchor carriers 128.

Several exemplary implementations are depicted for many-to-one DL/UL mapping 132. For example, each DL carrier 126 can be mapped independently (block 134). CQI feedback can be configured for each carrier independently. PUCCH mapping can be planned such that CQI feedbacks for different DL carriers do not overlap. Mapping of the CQI feedback can be conveyed to UE by RRC signaling. Legacy UEs can get the information to which resource blocks, time offset and periodicity to map the CQI feedback for each carrier. In particular, the distinct CQI per DL carrier (independent) can be reported in a concatenated in frequency fashion (block 136) discussed below with regard to FIGS. 2-3. Alternatively, the independent CQI can be reported in a cycle in time fashion (block 138) discussed below with regard to FIG. 4. As another alternatively, the independent CQI can be reported in a staggered in time and frequency fashion (block 140) discussed below with regard to FIG. 5. Rather than independent CQI per DL carrier, the multicarrier channel feedback mapping 132 can be reported jointly, treating as one wide bandwidth (block 142) discussed below with regard to FIG. 6. In particular, the table defining the subband size and bandwidth parts can be expanded as a function of system bandwidth As an alternative to independent or joint CQI multicarrier feedback mapping 134, 142, a single report defines a CQI format designed for multicarrier (MC) CQI feedback (block 144) discussed below with regard to FIG. 7. As yet another alternative, multicarrier channel feedback mapping 132 can comprise cycled carrier/subband reporting (block 146) wherein a portion of feedback reporting are reported for each scheduled instance, discussed below with regard to FIG. 8.

The wireless communication system 100 can also provide for the multicarrier UE 104*d* to perform aperiodic feedback at 150 in accordance with a network request or scheduling ("aperiodic feedback grant") 152 provided on multiple DL carriers 156 reported on an UL carrier 158, such as CQI 160 on PUCCH 162. In one aspect, feedback depicted as CQI 164 is better facilitated on a data transmission grant for Physical Uplink Shared Channel (PUSCH) 166 responsive to size and message format given by Radio Resource Control. It should be appreciated that the UEs 104*a*-104*b* can perform both periodic and aperiodic feedback.

Figures 2, 3:
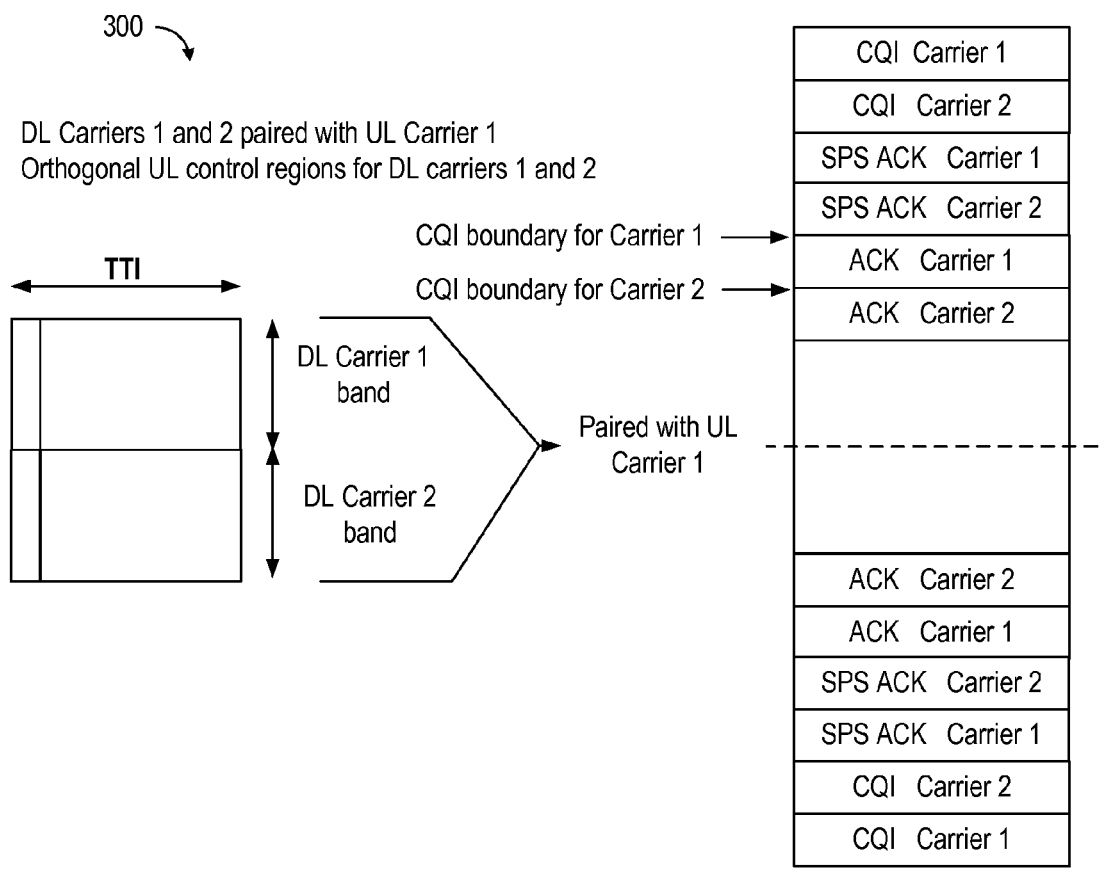
FIG. 2 depicts a diagram for a transmitted data structure for channel quality indicator (CQI) feedback.
FIG. 3 depicts a diagram for a data structure for independent, concatenated multicarrier feedback report format.

In FIG. 2, a transmitted data structure 200 provides independent CQI feedback per carrier, depicted as Carriers 1-3 concatenated in frequency during each time period "P". In FIG. 3, another example of independent, concatenated feedback reporting is depicted as data structure 300 for orthogonal UL control regions for DL Carriers 1 and 2 over a transmit time interval (TTI). In some instances, concatenating can result in a significant increase of PUCCH size for large number of carriers. Power reduction per CQI report can be imposed as compared to the single one at a time CQI report.

Figure 4:
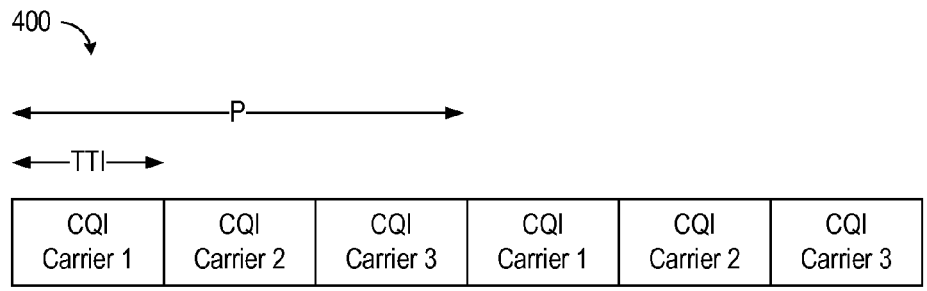
FIG. 4 depicts a diagram for a feedback data structure that cycles through carriers in time.

In FIG. 4, a data structure 400 is provided for feedback that cycles through carriers in time. Possible larger delay and CQI information inaccuracy can be a result implemented with the same overhead as in the single carrier case. Same delay can be achieved when feedback for different carriers are time offset with the same periodicity as in the single carrier case with larger overhead.

Figure 5:
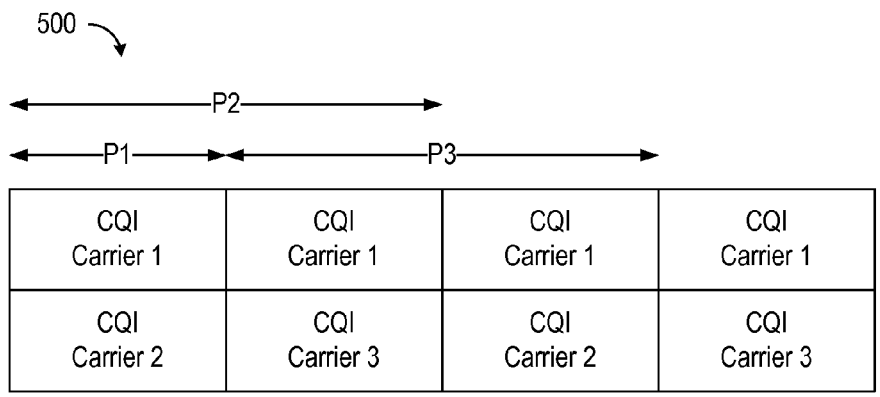
FIG. 5 depicts a diagram for a multicarrier feedback reporting structure staggered in time and frequency.

In FIG. 5, a data structure 500 is depicted for feedback staggered in time and frequency for channel feedback. Frequency resources, periodicity (e.g., P1=1, P2=2, P3=2) and offset (e.g., O1=0, O2=0, O3=1) for each DL carrier report are defined. Concatenating in frequency is the special case where all CQI reports have the same periodicity and offset. Cycling in time is the special case where all CQI reports have the same periodicity and different offset. Flexibility to adjust to the requirements of each carrier is provided, such as CQI reporting delay and overhead. In one aspect, wideband CQI over all carriers not explicitly reported but can be implicitly obtained from the wideband reports per carrier. If CQI feedback for different carriers is configured on the same resources but with different offset/periodicity, occasional collisions are possible. RRC could specify the rules defining which carrier has precedence.

Figure 6:
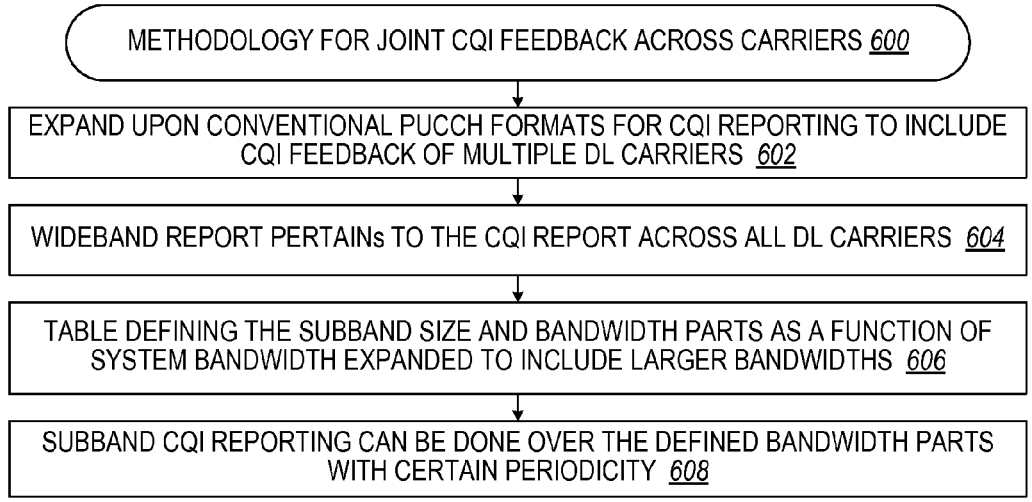
FIG. 6 depicts a flow diagram for a methodology for joint channel quality indicator feedback across carriers.

In FIG. 6, a methodology 600 for joint CQI feedback across carriers can expand upon conventional PUCCH formats for CQI reporting to include CQI feedback of multiple DL carriers (block 602). Wideband report would pertain to the CQI report across all DL carriers (block 604). The table defining the subband size and bandwidth parts as a function of system bandwidth is expanded to include larger bandwidths than 20 MHz, e.g., up to 100 MHz (block 606). Subband CQI reporting can be done over the defined bandwidth parts with certain periodicity (block 608). In one aspect, the wideband CQI reporting per carrier is not available and per carrier CQI feedback concept is lost. One bandwidth part could span two carriers.

In FIG. 7, a first data structure 700 for PUCCH format for CQI reporting to include CQI feedback of multiple DL carriers can include feedback of all/some DL carriers in one report. Each DL CQI feedback is configured with a same single mode. CQI feedback instances are concatenated. Wideband CQI report can consist of multiple wideband CQI reports, one for each carrier. Subband CQI report can consist of multiple subband CQI reports, one for each carrier. Explicit carrier information may be needed (e.g., if subset of carrier CQI reported is desired). Multiple options depending on the number of carriers can be implemented. For instance, configurations can be defined similarly as in the case of subband feedback. In another instance, options can be network configured (e.g., for aperiodic reporting only), UE selected or wideband mode. Joint coding across the concatenated CQI per reporting instance can be used. In one aspect, a larger payload size would result that would be particularly suitable for aperiodic feedback sent on Physical Uplink Shared Channel (PUSCH). For example, Modes 1-1 and 2-1 defined for periodic PUCCH transmission could be defined for use in aperiodic manner on PUSCH for multicarrier operations.

Figure 8:
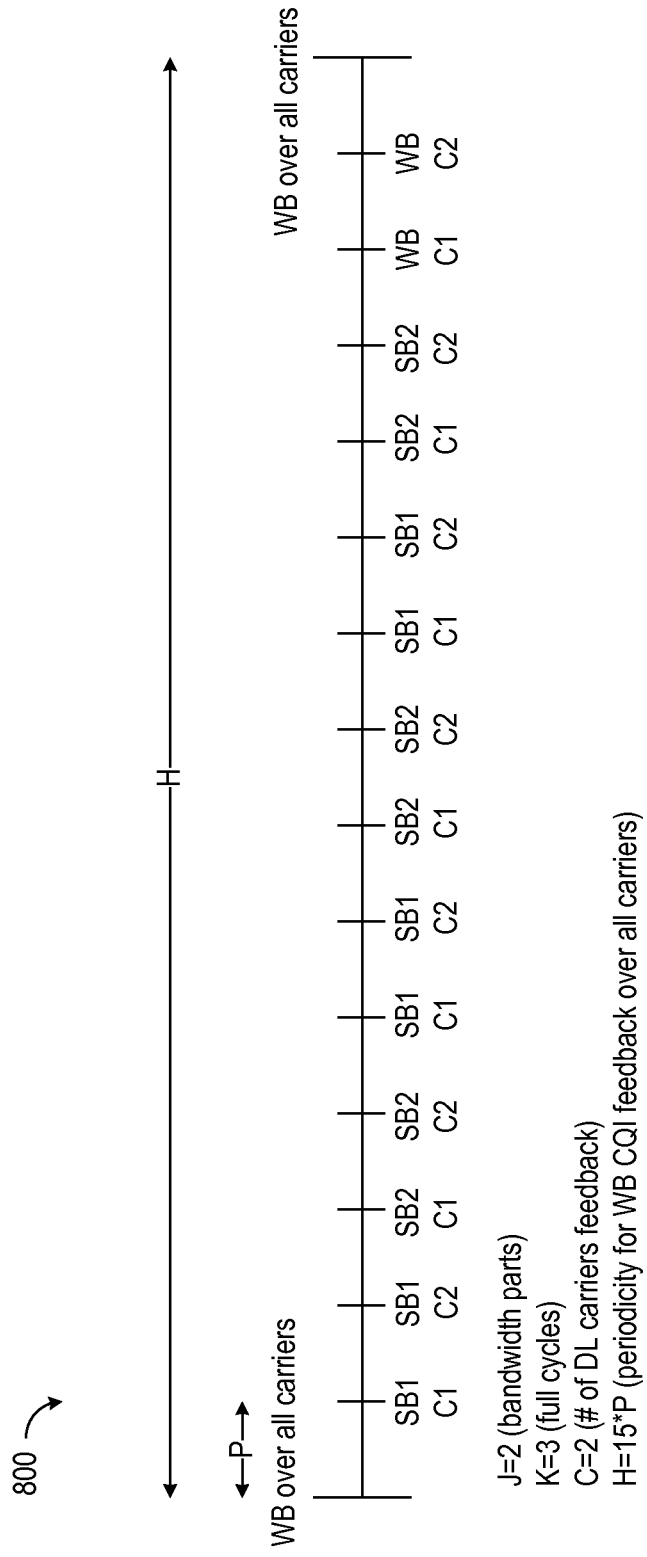
FIG. 8 depicts a diagram of a second data structure for a feedback report format.

In FIG. 8, in a second exemplary data structure 800 for PUCCH transmission of feedback treats each DL carrier in way similar to how subbands are conventionally addressed. For periodic reporting, wideband CQI over all carriers, wideband CQI for each carrier, and subband CQIs for each carrier would be sent with a certain periodicity.

Figure 9:
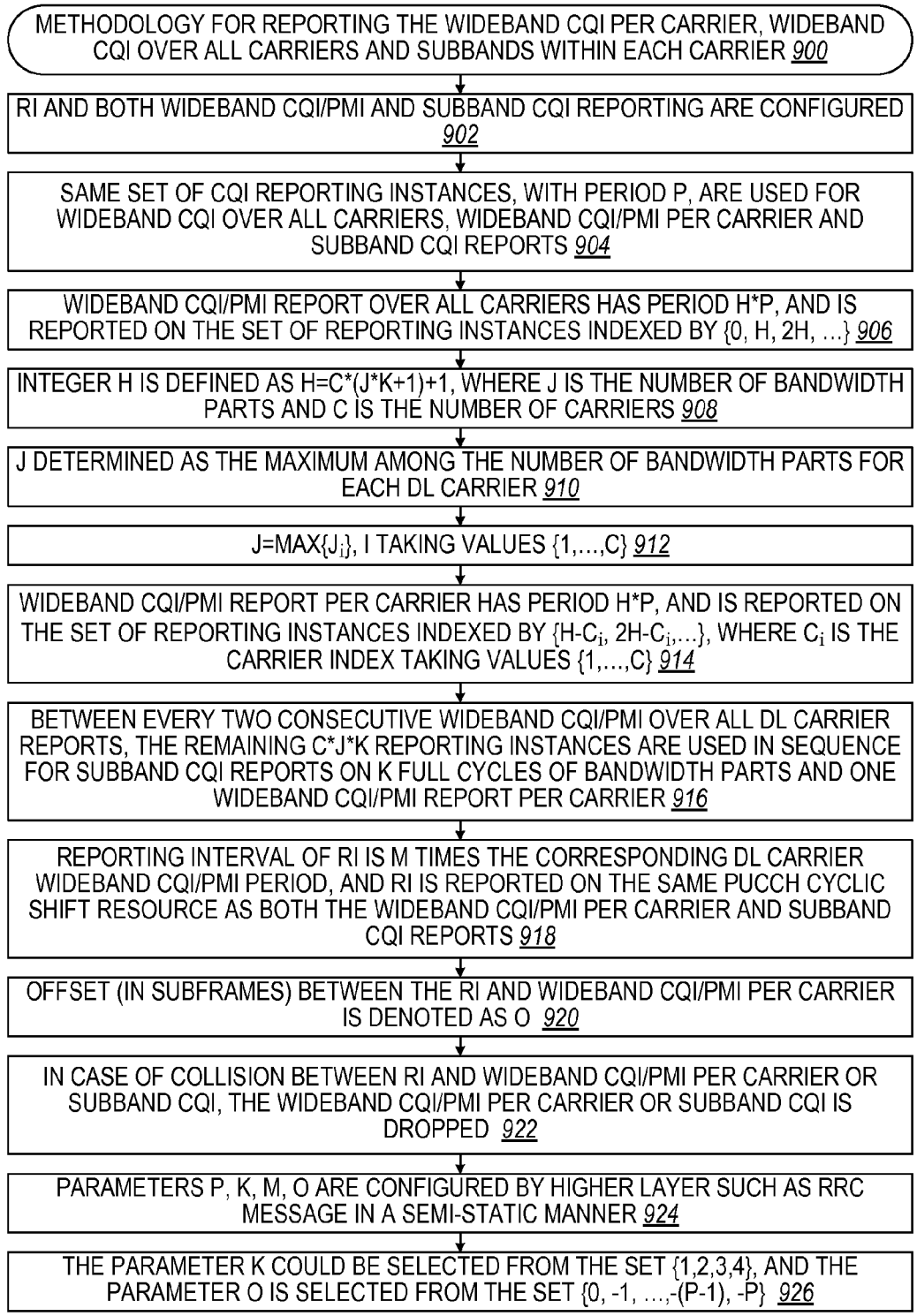
FIG. 9 depicts a flow diagram for a methodology for reporting wideband Channel Quality Indicator (CQI) feedback per carrier, wideband CQI over all carriers, ad subbands within each carrier.

For example, in FIG. 9 a methodology 900 is depicted for reporting the wideband CQI per carrier, wideband CQI over all carriers and subbands within each carrier. In one aspect, RI and both wideband CQI/PMI and subband CQI reporting are configured (block 902). In particular, the same set of CQI reporting instances, with period P, are used for wideband CQI over all carriers, wideband CQI/PMI per carrier and subband CQI reports (block 904). The wideband CQI/PMI report over all carriers has period H*P, and is reported on the set of reporting instances indexed by $\{0, H, 2H, \ldots\}$ (block 906). The integer H is defined as $H=C*(J*K+1)+1$, where J is the number of bandwidth parts and C is the number of carriers (block 908). J could be determined as the maximum among the number of bandwidth segments or parts for each DL carrier, i.e., the number of bandwidth parts depends on the carrier bandwidth (block 910). $J=\max\{J_i\}$, i that takes values $\{1, \ldots, C\}$ (block 912). The wideband CQI/PMI report per carrier has period H*P, and is reported on the set of reporting instances indexed by $\{H-C_i, 2H-C_i, \ldots\}$, where $C_i$ is the carrier index taking values $\{1, \ldots, C\}$ (block 914). Between every two consecutive wideband CQI/PMI over all DL carrier reports, the remaining C*J*K reporting instances are used in sequence for subband CQI reports on K full cycles of bandwidth parts and one wideband CQI/PMI report per carrier (block 916). The reporting interval of RI is M times the corresponding DL carrier wideband CQI/PMI period, and RI is reported on the same PUCCH cyclic shift resource as both the wideband CQI/PMI per carrier and subband CQI reports (block 918). The offset (in subframes) between the RI and wideband CQI/PMI per carrier is denoted as O (block 920). In case of collision between RI and wideband CQI/PMI per carrier or subband CQI, the wideband CQI/PMI per carrier or subband CQI is dropped (block 922). The parameters P, K, M, and O are configured by higher layer such as RRC message in a semi-static manner (block 924). The parameter K could be selected from the set $\{1, 2, 3, 4\}$, and the parameter O is selected from the set $\{0, -1, -(P-1), -P\}$ (block 926).

With regard to aperiodic channel feedback for multicarrier communication, it should be appreciated that the payload size increases if the number of carriers for which CQI is reported in one reporting instance is large. An advantageous approach is to transmit on PUSCH rather than PUCCH to provide resources necessary to accommodate the payload increase. For instance, modes 1-1 and 2-1 defined for periodic PUCCH transmission can be defined for use in aperiodic manner on PUSCH for multicarrier system. For one-to-one DL/UL CQI mapping, a conventional approach can be applied.

Figure 10:
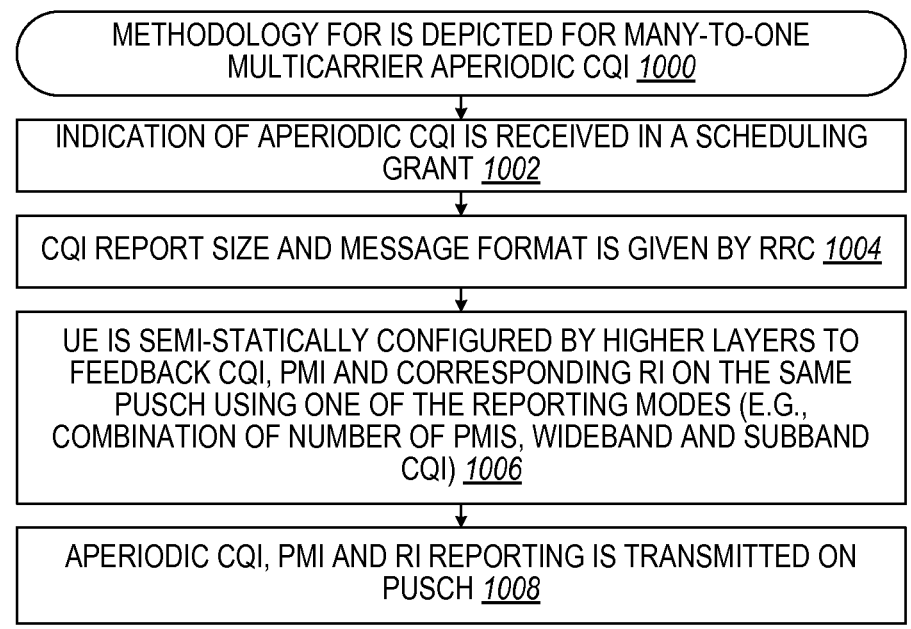
FIG. 10 depicts a flow diagram for a methodology for multicarrier many-to-one aperiodic CQI feedback.

To that end, in FIG. 10 a methodology 1000 is depicted for many-to-one multicarrier aperiodic CQI. Indication of aperiodic CQI is received in a scheduling grant (block 1002). CQI report size and message format is given by RRC (block 1004). UE is semi-statically configured by higher layers to feedback CQI, PMI and corresponding RI on the same PUSCH using one of the reporting modes (e.g., combination of number of PMIs, wideband and subband CQI) (block 1006). Aperiodic CQI, PMI and RI reporting is transmitted on PUSCH (block 1008).

Figure 11:
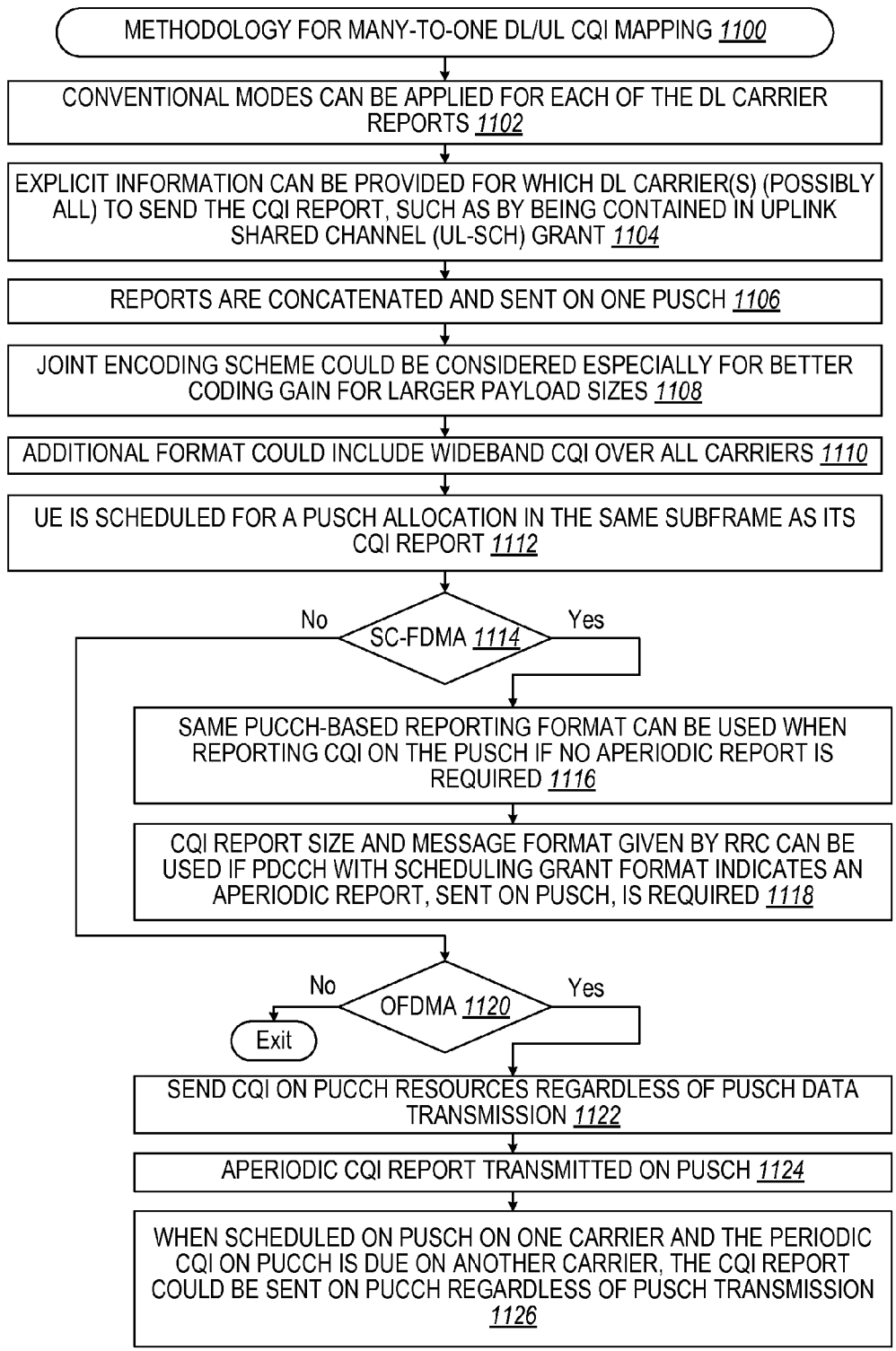
FIG. 11 depicts a flow diagram for a methodology for many-to-one mapping.

In one aspect in FIG. 11, a methodology 1100 is depicted for many-to-one DL/UL CQI mapping. Conventional modes can be applied for each of the DL carrier reports (blocks 1102). Explicit information can be provided for which DL carrier(s) (possibly all) to send the CQI report, such as by being contained in Uplink Shared Channel (UL-SCH) grant (block 1104). Reports are concatenated and sent on one PUSCH (block 1106). Joint encoding scheme could be considered especially for better coding gain for larger payload sizes (block 1108). Additional format could include wideband CQI over all carriers (block 1110).

With regard to transmission (Tx) of PUCCH and PUSCH CQI, UE is scheduled or allocated for a PUSCH allocation in the same subframe as its CQI report (block 1112).

If SC-FDMA (Single Carrier Frequency Division Multiple Access) UL is being used (i.e., both performing SC-FDMA) (block 1114), the same PUCCH-based reporting format can be used when reporting CQI on the PUSCH if no aperiodic report is required (block 1116). The CQI report size and message format given by RRC can be used if PDCCH with scheduling grant format indicates an aperiodic report, sent on PUSCH, is required (block 1118).

If OFDMA (orthogonal frequency division multiple access) UL is being used (block 1120) (i.e., no under no SC-FDMA restriction), it may be desirable to send CQI on PUCCH resources due to a more reliable transmission, regardless of PUSCH data transmission (block 1122). Implications are a smaller interference variation on PUCCH. Power control on PUCCH could ensure the desired operating point for control. When bundled on PUSCH, power control cannot do anything 'special' for control part. Resources designated for control on PUCCH are not wasted. Drawback is the higher PAR (Peak to Average Ratio) than in the single carrier operation. Aperiodic CQI report would be transmitted on PUSCH (block 1124).

Advantageously, when scheduled on PUSCH on one carrier and the periodic CQI on PUCCH is due on another carrier, the CQI report could be sent on PUCCH regardless of PUSCH transmission (block 1126). This approach has several implications. First, the rules for PUCCH (control) and PUSCH (data) are decoupled. Second, the error event when PUSCH grant is missed does not affect PUCCH. If control is supposed to be multiplexed with data across carriers and PUSCH grant is lost, UE would use PUCCH(s) for control while receiver would expect control on assigned PUSCH resources. Third, complicated and possibly error prone rules for multiplexing control and data across carrier would not have to be defined. The control mapping would depend on which carrier(s) have PUSCH transmission.

With regard to CQI procedure (i.e., SI and RRC), system information conveys information if the CQI/ACK mapping would go on designated UL carrier for a group of DLs carriers. An anchor UL carrier for all DL carriers can be a special case. Implicit mapping can be provided for paired UL carrier of a corresponding DL carrier. RRC signaling could override the system information. In case it is desirable to have different mapping for some UEs, RRC signaling notifies UE which resources to use for which carrier in the Physical Uplink Control Channel (PUCCH) space and with what reporting interval (periodicity) and reporting instance (offset) in case of independent reporting per carrier. RRC signaling can convey one set of parameters (e.g., resources to use in the PUCCH space, reporting interval (periodicity) and reporting instance (offset)) in case of joint reporting per carrier). RRC can set up appropriate parameters to establish "CQI boundaries" corresponding to each DL carrier to start ACK mapping for each DL carrier in the PUCCH space. Aperiodic CQI report size and message format can be given by RRC.

Figure 12:
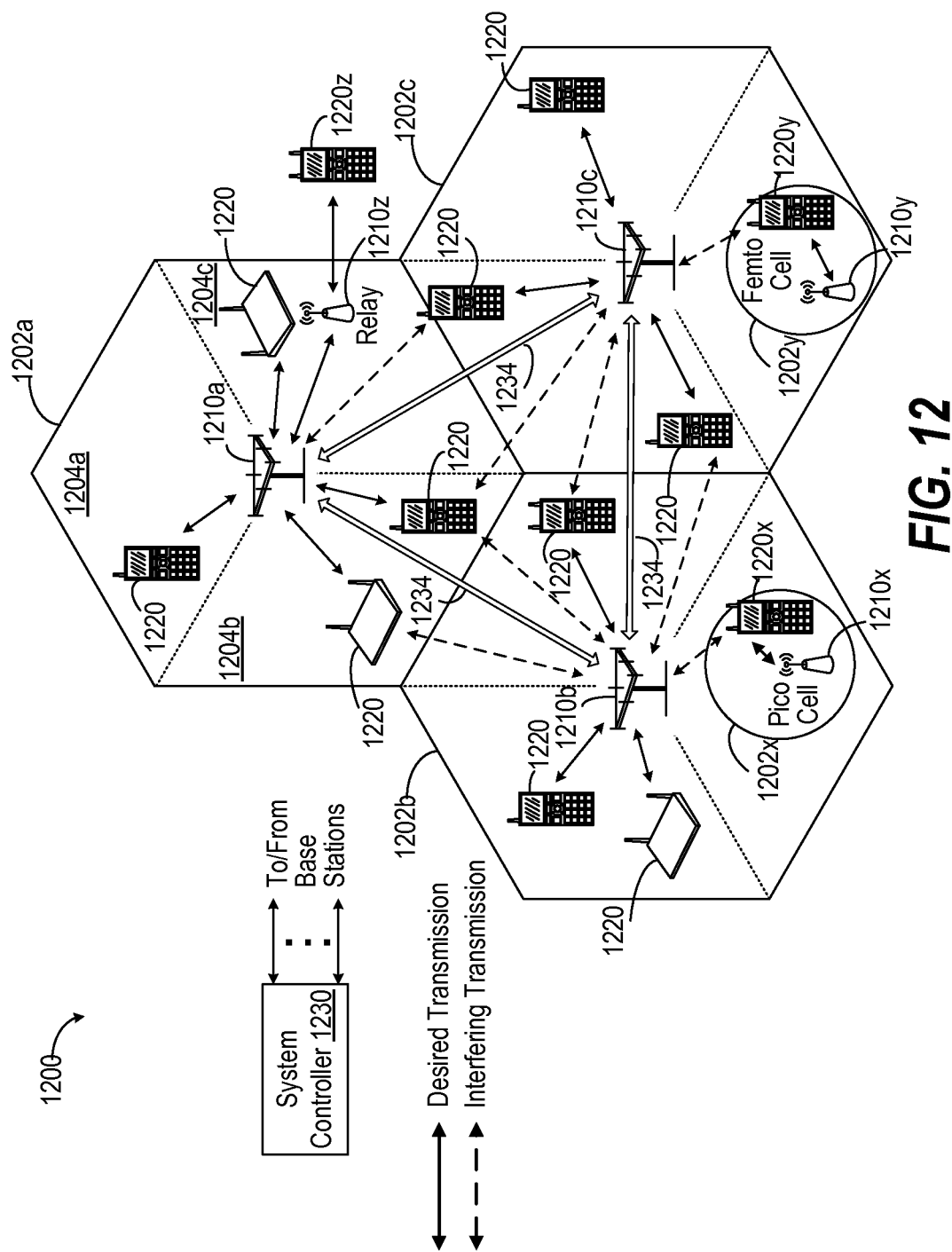
FIG. 12 depicts a diagram of an exemplary environment of wireless communication network.

In the example shown in FIG. 12, base stations 1210a, 1210b and 1210c may be macro base stations for macro cells 1202a, 1202b and 1202c, respectively. Base station 1210x may be a pico base station for a pico cell 1202x communicating with terminal 1220x. Base station 1210y may be a femto base station for a femto cell 1202y communicating with terminal 1220y. Although not shown in FIG. 12 for simplicity, the macro cells may overlap at the edges. The pico and femto cells may be located within the macro cells (as shown in FIG. 12) or may overlap with macro cells and/or other cells.

Wireless network 1200 may also include relay stations, e.g., a relay station 1210z that communicates with terminal 1220z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 1230 may couple to a set of base stations and provide coordination and control for these base stations. Network controller 1230 may be a single network entity or a collection of network entities. Network controller 1230 may communicate with base stations 1210 via a backhaul. Backhaul network communication 1234 can facilitate point-to-point communication between base stations 1210a-1210c employing such a distributed architecture. Base stations 1210a-1210c may also communicate with one another, e.g., directly or indirectly via wireless or wireline backhaul. Wireless network 1200 may be a homogeneous network that includes only macro base stations (not shown in FIG. 12). Wireless network 1200 may also be a heterogeneous network that includes base stations of different types, e.g., macro base stations, pico base stations, home base stations, relay stations, etc. These different types of base stations may have different transmit power levels, different coverage areas, and different impact on interference in wireless network 1200. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 1220 may be dispersed throughout wireless network 1200, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 12, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 1200 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 1202a, 1202b, or 1202c corresponding to a respective base station 1210a-1210c can be partitioned into multiple smaller areas (e.g., areas 1204a, 1204b, and 1204c). Each of the smaller areas 1204a, 1204b, and 1204c can be served by a respective base transceiver subsystem (BTS, not shown). As used herein and generally in the art, the term "sector" can refer to a BTS and/or its coverage area depending on the context in which the term is used. In one example, sectors 1204a, 1204b, 1204c in a cell 1202a, 1202b, 1202c can be formed by groups of antennas (not shown) at base station 1210, where each group of antennas is responsible for communication with terminals 1220 in a portion of the cell 1202a, 1202b, or 1202c. For example, a base station 1210 serving cell 1202a can have a first antenna group corresponding to sector 1204a, a second antenna group corresponding to sector 1204b, and a third antenna group corresponding to sector 1204c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 13:
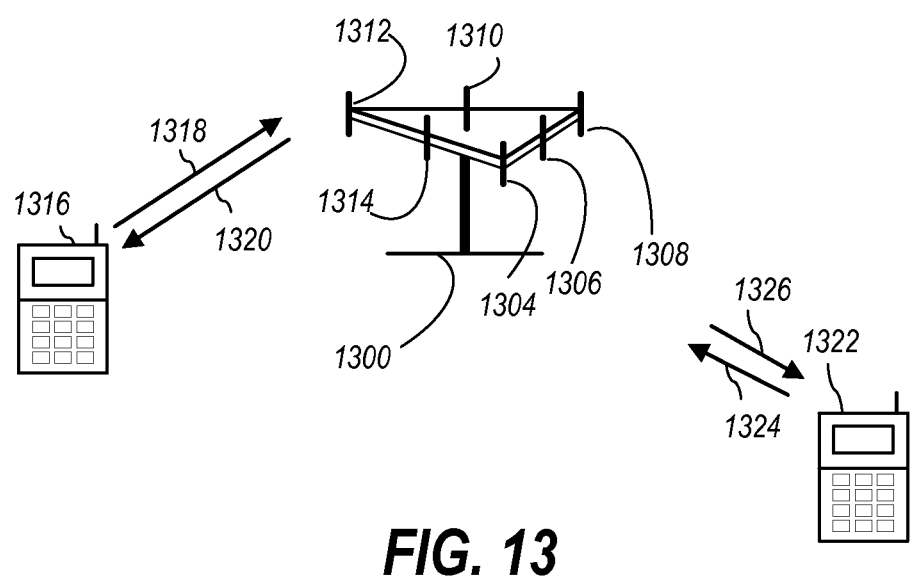
FIG. 13 depicts a diagram of a multiple access wireless communication system.

Referring to FIG. 13, a multiple access wireless communication system according to one aspect is illustrated. An access point (AP) 1300 includes multiple antenna groups, one including 13013 and 1306, another including 1308 and 1310, and an additional including 1312 and 1314. In FIG. 13, only two antennas are shown for each antenna group, however, more or fewer antennas may be utilized for each antenna group. Access terminal (AT) 1316 is in communication with antennas 1312 and 1314, where antennas 1312 and 1314 transmit information to access terminal 1316 over forward link 1320 and receive information from access terminal 1316 over reverse link 1318. Access terminal 1322 is in communication with antennas 1306 and 1308, where antennas 1306 and 1308 transmit information to access terminal 1322 over forward link 1326 and receive information from access terminal 1322 over reverse link 1324. In a FDD system, communication links 1318, 1320, 1324 and 1326 may use different frequencies for communication. For example, forward link 1320 may use a different frequency then that used by reverse link 1318.

Each group of antennas and/or the area in which they are designed to communicate is often referred to as a sector of the access point. In the aspect, antenna groups each are designed to communicate to access terminals in a sector, of the areas covered by access point 1300.

In communication over forward links 1320 and 1326, the transmitting antennas of access point 1300 utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
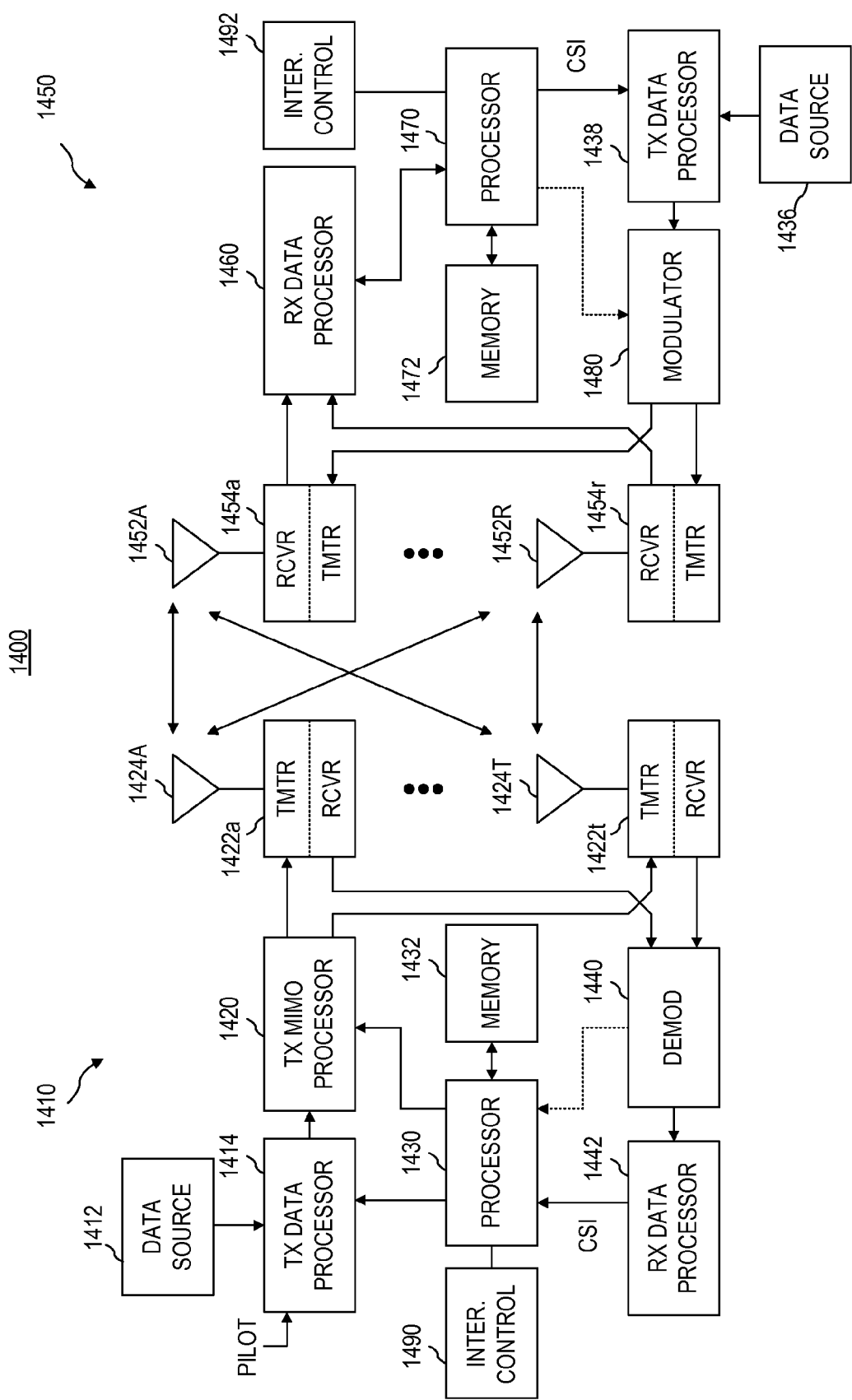
FIG. 14 depicts a schematic diagram of a multiple-input-multiple-output (MIMO) communication system of a base station and a terminal.

The teachings herein may be incorporated into a node (e.g., a device) employing various components for communicating with at least one other node. FIG. 14 depicts several sample components that may be employed to facilitate communication between nodes. Specifically, FIG. 14 illustrates a wireless device 1410 (e.g., an access point) and a wireless device 1450 (e.g., an access terminal) of a MIMO system 1400. At the device 1410, traffic data for a number of data streams is provided from a data source 1412 to a transmit ("TX") data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers ("XCVR") 1422a through 1422t that each has a transmitter (TMTR) and receiver (RCVR). In some aspects, the TX MIMO processor 1420 applies beamforming weights to the symbols of the data streams and to the antenna from which the symbol is being transmitted.

Each transceiver 1422a-1422t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422a through 1422t are then transmitted from $N_T$ antennas 1424a through 1424t, respectively.

At the device 1450, the transmitted modulated signals are received by $N_R$ antennas 1452a through 1452r and the received signal from each antenna 1452a-1452r is provided to a respective transceiver ("XCVR") 1454a through 1454r. Each transceiver 1454a-1454r conditions (e.g., filters, amplifies, and downconverts) a respective received signal, digitizes the conditioned signal to provide samples, and further processes the samples to provide a corresponding "received" symbol stream.

A receive ("RX") data processor 1460 then receives and processes the $N_R$ received symbol streams from $N_R$ transceivers 1454a-1454r based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use. The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454a through 1454r, and transmitted back to the device 1410.

At the device 1410, the modulated signals from the device 1450 are received by the antennas 1424a-1424t, conditioned by the transceivers 1422a-1422t, demodulated by a demodulator ("DEMOD") 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform interference control operations. For example, an interference ("INTER.") control component 1490 may cooperate with the processor 1430 and/or other components of the device 1410 to send/receive signals to/from another device (e.g., device 1450). Similarly, an interference control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the interference control component 1490 and the processor 1430 and a single processing component may provide the functionality of the interference control component 1492 and the processor 1470.

Figure 15:
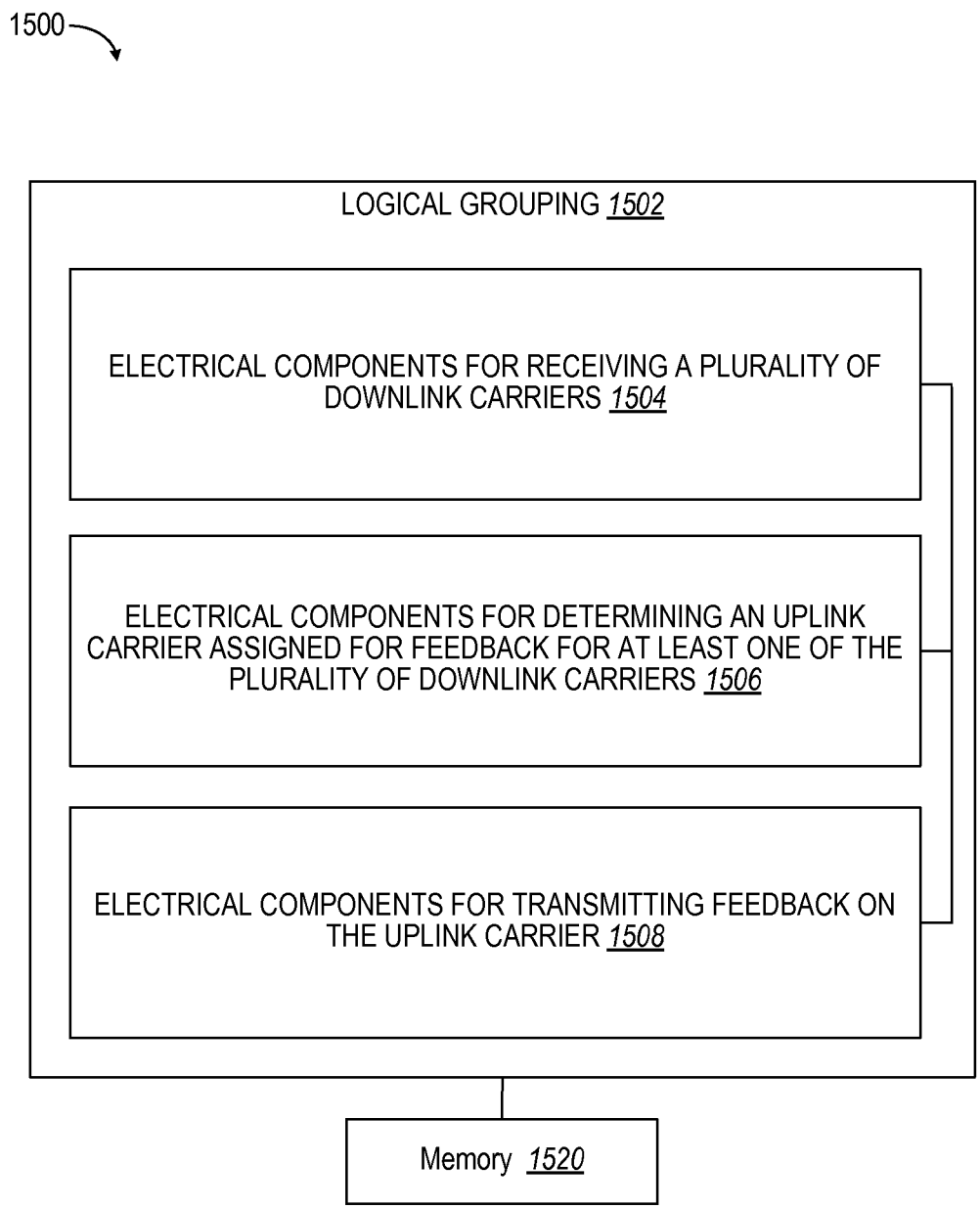
FIG. 15 depicts a block diagram of a logical grouping of electrical components for transmitting uplink feedback for multiple downlink carriers.

With reference to FIG. 15, illustrated is a system 1500 for transmitting uplink feedback for multiple downlink carriers. For example, system 1500 can reside at least partially within user equipment (UE). It is to be appreciated that system 1500 is represented as including functional blocks, which can be functional blocks that represent functions implemented by a computing platform, processor, software, or combination thereof (e.g., firmware). System 1500 includes a logical grouping 1502 of electrical components that can act in conjunction. For instance, logical grouping 1502 can include an electrical component for receiving a plurality of downlink carriers 1504. Moreover, logical grouping 1502 can include an electrical component for determining an uplink carrier assigned for feedback for at least one of the plurality of downlink carriers 1506. Further, logical grouping 1502 can include an electrical component for transmitting feedback on the uplink carrier 1508. Additionally, system 1500 can include a memory 1520 that retains instructions for executing functions associated with electrical components 1504-1508. While shown as being external to memory 1520, it is to be understood that one or more of electrical components 1504-1508 can exist within memory 1520.

Figure 16:
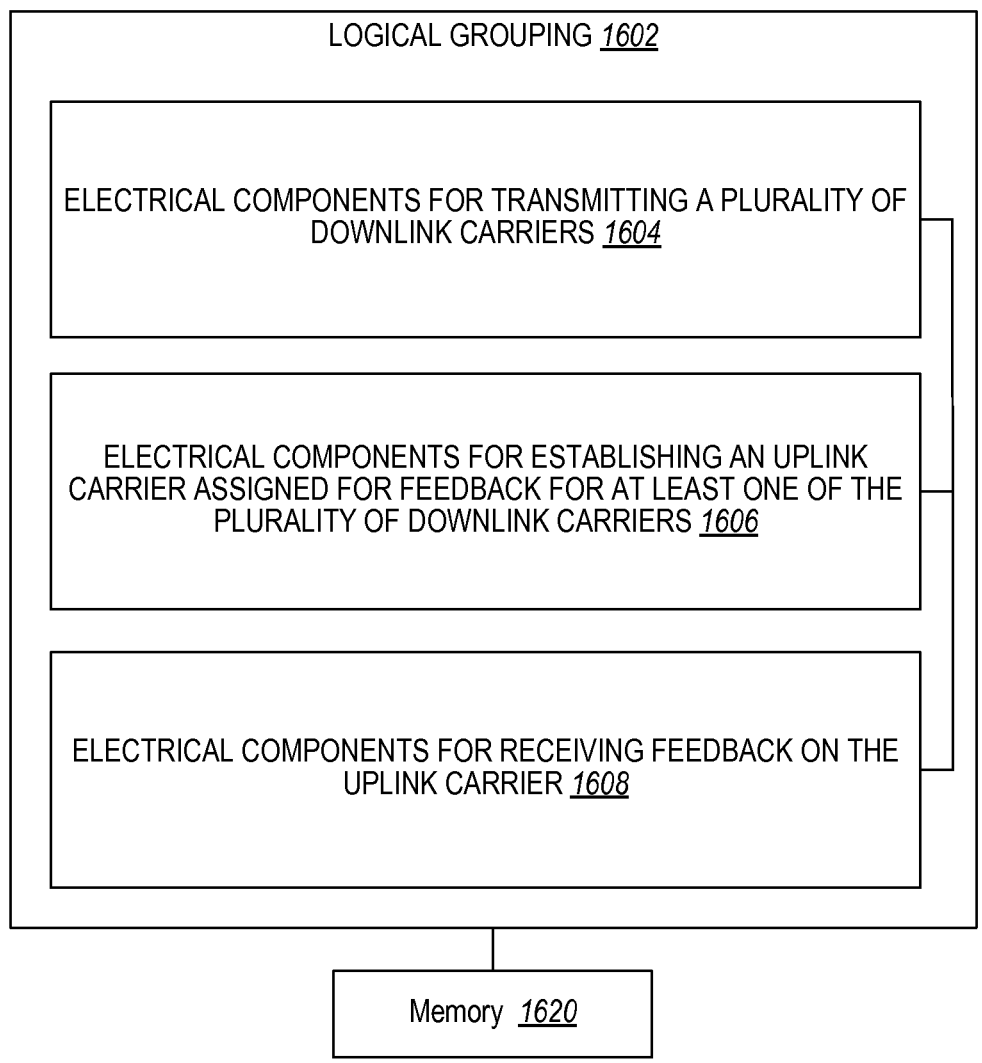
FIG. 16 depicts a block diagram of a logical grouping of electrical components for receiving uplink feedback for multiple downlink carriers.

With reference to FIG. 16, illustrated is a system 1600 for receiving uplink feedback for multiple downlink carriers. For example, system 1600 can reside at least partially within a network entity (e.g., evolved base node). It is to be appreciated that system 1600 is represented as including functional blocks, which can be functional blocks that represent functions implemented by a computing platform, processor, software, or combination thereof (e.g., firmware). System 1600 includes a logical grouping 1602 of electrical components that can act in conjunction. For instance, logical grouping 1602 can include an electrical component for transmitting a plurality of downlink carriers 1604. Moreover, logical grouping 1602 can include an electrical component for establishing an uplink carrier assigned for feedback for at least one of the plurality of downlink carriers 1606. Further, logical grouping 1602 can include an electrical component for receiving feedback on the uplink carrier 1608. Additionally, system 1600 can include a memory 1620 that retains instructions for executing functions associated with electrical components 1604-1608. While shown as being external to memory 1620, it is to be understood that one or more of electrical components 1604-1608 can exist within memory 1620.

Figure 17:
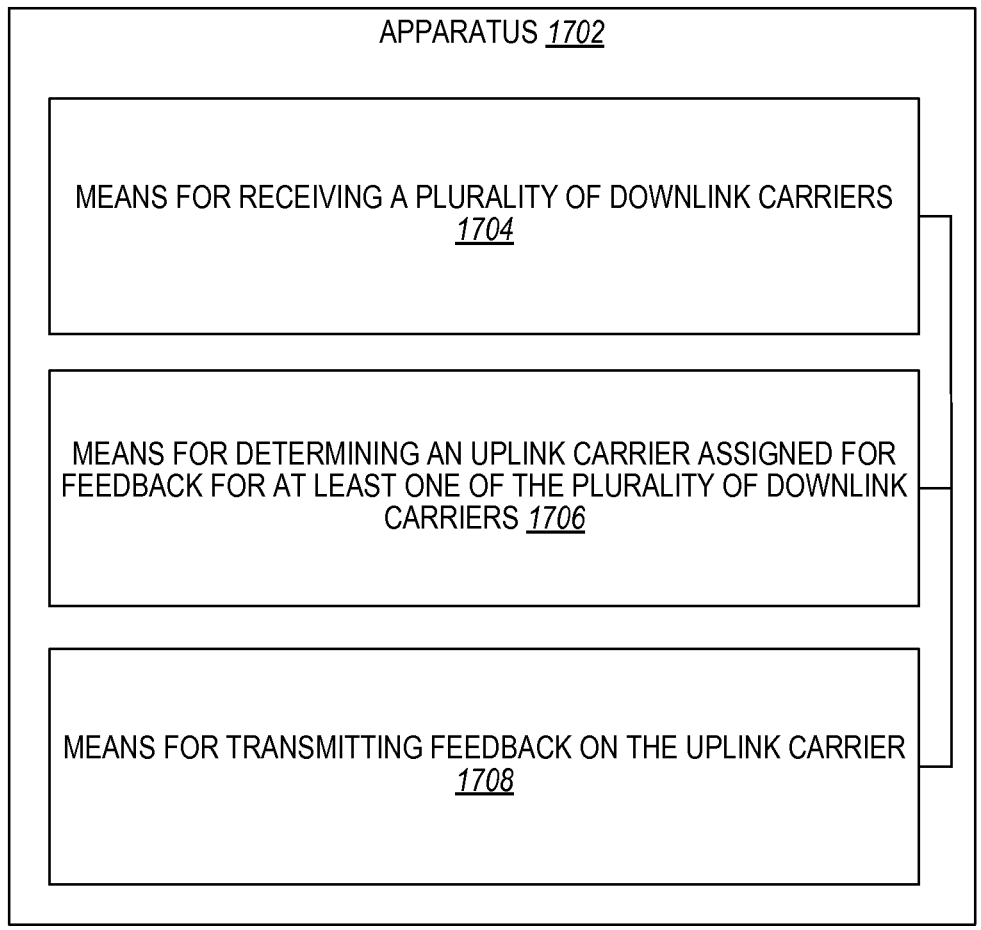
FIG. 17 depicts a block diagram of an apparatus having means for transmitting uplink feedback for multiple downlink carriers.

In FIG. 17, an apparatus 1702 is depicted for transmitting uplink feedback for multiple downlink carriers. Means 1704 are provided for receiving a plurality of downlink carriers. Means 1706 are provided for determining an uplink carrier assigned for feedback for at least one of the plurality of downlink carriers. Means 1708 are provided for transmitting feedback on the uplink carrier.

Figure 18:
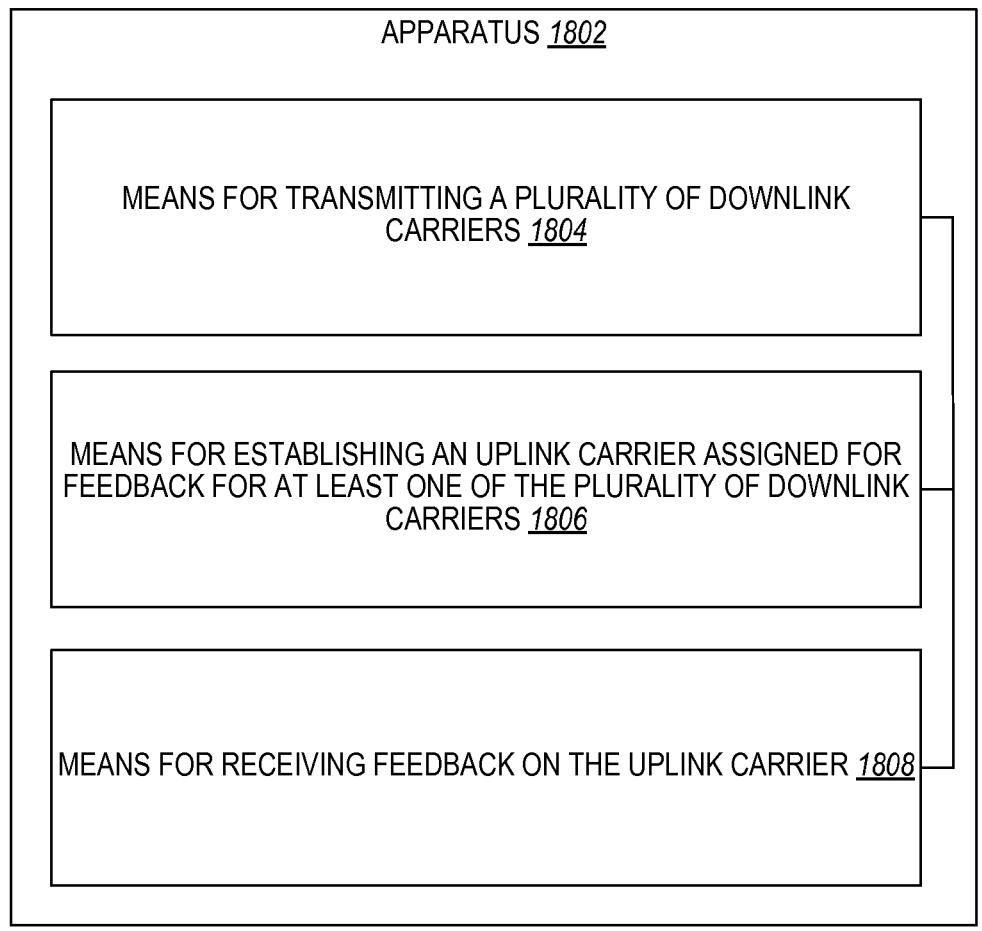
FIG. 18 depicts a block diagram of an apparatus having means for receiving uplink feedback for multiple downlink carriers.

In FIG. 18, an apparatus 1802 is depicted for receiving uplink feedback for multiple downlink carriers. Means 1804 are provided for transmitting a plurality of downlink carriers. Means 1806 are provided for establishing an uplink carrier assigned for feedback for at least one of the plurality of downlink carriers. Means 1808 are provided for receiving feedback on the uplink carrier.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for transmitting uplink feedback for multiple downlink carriers, comprising:
   receiving a plurality of downlink carriers, each of the plurality of downlink carriers comprising a different frequency range from other carriers of the plurality of downlink carriers;
   determining an uplink carrier assigned for feedback for the plurality of downlink carriers;
   determining which downlink carrier of the plurality of downlink carriers has precedence if a collision occurs between a first feedback for at least one of the plurality of downlink carriers and a second feedback for a different one of the plurality of downlink carriers, wherein carrier precedence is determined based at least in part on:
      a type of feedback when the collision occurs between different types of feedback, and
      radio resource control (RRC) signaling when the collision occurs between a same type of feedback; and
   reporting the first or second feedback on the uplink carrier based on the determined carrier precedence.

2. The method of claim 1, wherein the collision occurs when the second feedback for the different one of the plurality of downlink carriers is configured to be transmitted on a same subframe as the first feedback for the at least one of the plurality of downlink carriers.

3. The method of claim 1, wherein carriers with feedback containing a rank indicator (RI) have higher precedence over carriers with feedback containing wideband CQI/PMI or subband CQI.

4. The method of claim 1, wherein a radio resource control signal specifies rules defining which carrier has precedence between the at least one of the plurality of downlink carriers and the different one of the plurality of downlink carriers in transmitting the feedback on the uplink carrier.

5. The method of claim 2, wherein only feedback of a carrier with the highest precedence among the at least one of the plurality of downlink carriers and the different one of the plurality of downlink carriers is transmitted in the subframe.

6. The method of claim 5, wherein the feedback of the carrier with the highest precedence is a channel quality indicator (CQI).

7. The method of claim 5, wherein the feedback of the carrier with the highest precedence is a rank indicator (RI).

8. The method of claim 5, wherein the feedback of the carrier with the highest precedence is a precoding matrix indicator (PMI).

9. A method for transmitting uplink feedback for multiple downlink carriers, comprising:
   receiving a plurality of downlink carriers;
   determining an uplink carrier assigned for feedback for at least one of the plurality of downlink carriers;
   transmitting feedback on the uplink carrier;
   reporting wideband feedback over all downlink carriers with a first periodicity, wideband feedback for each downlink carrier with a second periodicity, and subband feedback for subband of each downlink carrier with a third periodicity; and
   configuring Rank indicator (RI) and both wideband Channel Quality Indicator/Precoding Matrix Indicator (CQI/PMI) and subband CQI reporting over a periodic set of CQI reporting instances with period 'P', wherein wideband CQI/PMI report over all carriers has period H*P, and is reported on a set of reporting instances indexed by {0, H, 2H, . . . } and integer 'H' is defined as H=C*(J*K+1)+1, where integer J is a number of bandwidth segments and integer C is a number of downlink carriers, wherein wideband CQI/PMI report per carrier has period H*P, and is reported on the set of reporting instances indexed by {H−Ci, 2H−Ci, . . . }, where Ci is a carrier index that takes values {1, . . . , C}; and wherein between every two consecutive wideband CQI/PMI over all DL carrier reports, the remaining C*J*K reporting instances are used in sequence for subband CQI reports on K full cycles of bandwidth parts and one wideband CQI/PMI report per carrier.

10. The method of claim 9, wherein integer J is determined as a minimum or a maximum of bandwidth parts for each DL carrier depending upon carrier bandwidth such that J=min{Ji} or J=max{Ji} respectively, i taking values {1, . . . , C}.

11. A computer program product for transmitting uplink feedback for multiple downlink carriers, comprising at least one non-transitory computer readable storage medium storing computer executable instructions comprising:
a first set of instructions for causing a computer to receive a plurality of downlink carriers;
a second set of instructions for causing the computer to determine an uplink carrier assigned for feedback for at least one of the plurality of downlink carriers;
a third set of instructions for causing the computer to transmit feedback on the uplink carrier;
a fourth set of instructions for causing the computer to report wideband feedback over all downlink carriers with a first periodicity, wideband feedback for each downlink carrier with a second periodicity, and subband feedback for subband of each downlink carrier with a third periodicity; and
a fifth set of instructions for causing the computer to configure Rank indicator (RI) and both wideband Channel Quality Indicator/Precoding Matrix Indicator (CQI/PMI) and subband CQI reporting over a periodic set of CQI reporting instances with period 'P',
wherein wideband CQI/PMI report over all carriers has period H*P, and is reported on a set of reporting instances indexed by {0, H, 2H, . . . } and integer 'H' is defined as H=C*(J*K+1)+1, where integer J is a number of bandwidth segments and integer C is a number of downlink carriers,
wherein wideband CQI/PMI report per carrier has period H*P, and is reported on the set of reporting instances indexed by {H−Ci, 2H−Ci, . . . }, where Ci is a carrier index that takes values {1, . . . , C}; and
wherein between every two consecutive wideband CQI/PMI over all DL carrier reports, the remaining C*J*K reporting instances are used in sequence for subband CQI reports on K full cycles of bandwidth parts and one wideband CQI/PMI report per carrier.

12. An apparatus for transmitting uplink feedback for multiple downlink carriers, comprising:
means for receiving a plurality of downlink carriers;
means for determining an uplink carrier assigned for feedback for at least one of the plurality of downlink carriers;
means for transmitting feedback on the uplink carrier;
means for reporting wideband feedback over all downlink carriers with a first periodicity, wideband feedback for each downlink carrier with a second periodicity, and subband feedback for subband of each downlink carrier with a third periodicity; and
means for configuring Rank indicator (RI) and both wideband Channel Quality Indicator/Precoding Matrix Indicator (CQI/PMI) and subband CQI reporting over a periodic set of CQI reporting instances with period 'P',
wherein wideband CQI/PMI report over all carriers has period H*P, and is reported on a set of reporting instances indexed by {0, H, 2H, . . . } and integer 'H' is defined as H=C*(J*K+1)+1, where integer J is a number of bandwidth segments and integer C is a number of downlink carriers,
wherein wideband CQI/PMI report per carrier has period H*P, and is reported on the set of reporting instances indexed by {H−Ci, 2H−Ci, . . . }, where Ci is a carrier index that takes values {1, . . . , C}; and
wherein between every two consecutive wideband CQI/PMI over all DL carrier reports, the remaining C*J*K reporting instances are used in sequence for subband CQI reports on K full cycles of bandwidth parts and one wideband CQI/PMI report per carrier.

13. An apparatus for transmitting uplink feedback for multiple downlink carriers, comprising:
a receiver for receiving a plurality of downlink carriers;
a computing platform for determining an uplink carrier assigned for feedback for at least one of the plurality of downlink carriers and further for configuring Rank indicator (RI) and both wideband Channel Quality Indicator/Precoding Matrix Indicator (CQI/PMI) and subband CQI reporting over a periodic set of CQI reporting instances with period 'P',
wherein wideband CQI/PMI report over all carriers has period H*P, and is reported on a set of reporting instances indexed by {0, H, 2H, . . . } and integer 'H' is defined as H−C*(J*K+1)+1, where integer J is a number of bandwidth segments and integer C is a number of downlink carriers,
wherein wideband CQI/PMI report per carrier has period H*P, and is reported on the set of reporting instances indexed by {H−Ci, 2H−Ci, . . . }, where Ci is a carrier index that takes values {1, . . . , C}; and
wherein between every two consecutive wideband CQI/PMI over all DL carrier reports, the remaining C*J*K reporting instances are used in sequence for subband CQI reports on K full cycles of bandwidth parts and one wideband CQI/PMI report per carrier; and
a transmitter for transmitting feedback on the uplink carrier and for reporting wideband feedback over all downlink carriers with a first periodicity, wideband feedback for each downlink carrier with a second periodicity, and subband feedback for subband of each downlink carrier with a third periodicity.

14. The apparatus of claim 13, wherein integer J is determined as a minimum or a maximum of bandwidth parts for each DL carrier depending upon carrier bandwidth such that J-min{Ji} or J=max {Ji} respectively, i taking values {1, . . . , C}.

15. A method for receiving uplink feedback for multiple downlink carriers, comprising:
transmitting a plurality of downlink carriers;
establishing an uplink carrier assigned for feedback for at least one of the plurality of downlink carriers;
receiving feedback on the uplink carriers;
receiving reporting of wideband feedback over all downlink carriers with a first periodicity, wideband feedback for each downlink carrier with a second periodicity, and subband feedback for subband of each downlink carrier with a third periodicity; and configuring Rank indicator (RI) and both wideband Channel Quality Indicator/Precoding Matrix Indicator (CQI/PMI) and subband CQI reporting over a periodic set of CQI reporting instances with period 'P', wherein wideband CQI/PMI report over all carriers has period H*P, and is reported on a set of reporting instances indexed by {0, H, 2H, . . . } and integer 'H' is defined as H=C*(J*K+1)+1, where integer J is a number of bandwidth segments and integer C is a number of downlink carriers, wherein wideband CQI/PMI report per carrier has period H*P, and is reported on the set of reporting instances indexed by {H−Ci, 2H−Ci, . . . }, where Ci is a carrier index that takes values {1, . . . , C}; and wherein between every two consecutive wideband CQI/PMI over all DL carrier reports, the remaining C*J*K reporting instances are used in sequence for subband CQI reports on K full cycles of bandwidth parts and one wideband CQI/PMI report per carrier.

16. The method of claim 15, wherein integer J is determined as a maximum of bandwidth parts for each DL carrier depending upon carrier bandwidth such that J=max{Ji}, i taking values {1, . . . , C}.

17. An apparatus for receiving uplink feedback for multiple downlink carriers, comprising:
a transmitter for transmitting a plurality of downlink carriers;
a computer platform for establishing an uplink carrier assigned for feedback for at least one of the plurality of downlink carriers and for configuring Rank indicator (RI) and both wideband Channel Quality Indicator/Precoding Matrix Indicator (CQI/PMI) and subband CQI reporting over a periodic set of CQI reporting instances with period 'P',
wherein wideband CQI/PMI report over all carriers has period H*P, and is reported on a set of reporting instances indexed by {0, H, 2H, . . . } and integer 'H' is defined as H−C*(J*K+1)+1, where integer J is a number of bandwidth segments and integer C is a number of downlink carriers,
wherein wideband CQI/PMI report per carrier has period H*P, and is reported on the set of reporting instances indexed by {H−Ci, 2H−Ci, . . . }, where Ci is a carrier index that takes values {1, . . . , C}; and
wherein between every two consecutive wideband CQI/PMI over all DL carrier reports, the remaining C*J*K reporting instances are used in sequence for subband CQI reports on K full cycles of bandwidth parts and one wideband CQI/PMI report per carrier; and
a receiver for receiving feedback on the uplink carrier and for receiving reporting of wideband feedback over all downlink carriers with a first periodicity, wideband feedback for each downlink carrier with a second periodicity, and subband feedback for subband of each downlink carrier with a third periodicity.

18. The apparatus of claim 17, wherein integer J is determined as a maximum of bandwidth parts for each DL carrier depending upon carrier bandwidth such that J=max{Ji}, i taking values {1, . . . , C}.

19. An apparatus for transmitting uplink feedback for multiple downlink carriers, comprising:
means for receiving a plurality of downlink carriers, each of the plurality of downlink carriers comprising a different frequency range from other carriers of the plurality of downlink carriers;
means for determining an uplink carrier assigned for feedback for the plurality of downlink carriers;
means for determining which downlink carrier of the plurality of downlink carriers has precedence if a collision occurs between a first feedback for at least one of the plurality of downlink carriers and a second feedback for a different one of the plurality of downlink carriers, wherein carrier precedence is determined based at least in part on:
a type of feedback when the collision occurs between different types of feedback, and
radio resource control (RRC) signaling when the collision occurs between a same type of feedback; and
means for reporting the first or second feedback on the uplink carrier based on the determined carrier precedence.

20. The apparatus of claim 19, wherein the collision occurs when the second feedback for the different one of the plurality of downlink carriers is configured to be transmitted on a same subframe as the first feedback for the at least one of the plurality of downlink carriers.

21. The apparatus of claim 20, wherein only feedback of a carrier with the highest precedence among the at least one of the plurality of downlink carriers and the different one of the plurality of downlink carriers is transmitted in the subframe.

22. The apparatus of claim 21, wherein the feedback of the carrier with the highest precedence is a channel quality indicator (CQI).

23. The apparatus of claim 21, wherein the feedback of the carrier with the highest precedence is a rank indicator (RI).

24. The apparatus of claim 21, wherein the feedback of the carrier with the highest precedence is a precoding matrix indicator (PMI).

25. The apparatus of claim 19, wherein carriers with feedback containing a rank indicator (RI) have higher precedence over carriers with feedback containing wideband CQI/PMI or subband CQI.

26. The apparatus of claim 19, wherein a radio resource control signal specifies rules defining which carrier has precedence between the at least one of the plurality of downlink carriers and the different one of the plurality of downlink carriers in transmitting the feedback on the uplink carrier.

27. A computer program product for transmitting uplink feedback for multiple downlink carriers, comprising a computer-readable storage comprising:
code for receiving a plurality of downlink carriers, each of the plurality of downlink carriers comprising a different frequency range from other carriers of the plurality of downlink carriers;
code for determining an uplink carrier assigned for feedback for the plurality of downlink carriers;
code for determining which downlink carrier of the plurality of downlink carriers has precedence if a collision occurs between a first feedback for at least one of the plurality of downlink carriers and a second feedback for a different one of the plurality of downlink carriers, wherein carrier precedence is determined based at least in part on:
a type of feedback when the collision occurs between different types of feedback, and
radio resource control (RRC) signaling when the collision occurs between a same type of feedback; and
code for reporting the first or second feedback on the uplink carrier based on the determined carrier precedence.

28. The computer program product of claim 27, wherein the collision occurs when the second feedback for the different one of the plurality of downlink carriers is configured to be transmitted on a same subframe as the first feedback for the at least one of the plurality of downlink carriers.

29. The computer program product of claim 28, wherein only feedback of a carrier with the highest precedence among the at least one of the plurality of downlink carriers and the different one of the plurality of downlink carriers is transmitted in the subframe.

30. The computer program product of claim 27, wherein carriers with feedback containing a rank indicator (RI) have higher precedence over carriers with feedback containing wideband CQI/PMI or subband CQI.

31. The computer program product of claim 27, wherein a radio resource control signal specifies rules defining which carrier has precedence between the at least one of the plurality of downlink carriers and the different one of the plurality of downlink carriers in transmitting the feedback on the uplink carrier.

32. An apparatus for transmitting uplink feedback for multiple downlink carriers, comprising:
- a receiver for receiving a plurality of downlink carriers, each of the plurality of downlink carriers comprising a different frequency range from other carriers of the plurality of downlink carriers;
- a processor for determining an uplink carrier assigned for feedback for the plurality of downlink carriers and for determining which downlink carrier of the plurality of downlink carriers has precedence if a collision occurs between a first feedback for at least one of the plurality of downlink carriers and a second feedback for a different one of the plurality of downlink carriers, wherein carrier precedence is determined based at least in part on:
  - a type of feedback when the collision occurs between different types of feedback, and
  - radio resource control (RRC) signaling when the collision occurs between a same type of feedback; and
- a transmitter for transmitting the first or second feedback on the uplink carrier based on the determined carrier precedence.

33. The apparatus of claim 32, wherein the collision occurs when the second feedback for the different one of the plurality of downlink carriers is configured to be transmitted on a same subframe as the first feedback for the at least one of the plurality of downlink carriers.

34. The apparatus of claim 33, wherein only feedback of a carrier with the highest precedence among the at least one of the plurality of downlink carriers and the different one of the plurality of downlink carriers is transmitted in the subframe.

35. The apparatus of claim 32, wherein carriers with feedback containing a rank indicator (RI) have higher precedence over carriers with feedback containing wideband CQI/PMI or subband CQI.

36. The apparatus of claim 32, wherein a radio resource control signal specifies rules defining which carrier has precedence between the at least one of the plurality of downlink carriers and the different one of the plurality of downlink carriers in transmitting the feedback on the uplink carrier.

* * * * *